United States Patent Office 3,258,005
Patented June 28, 1966

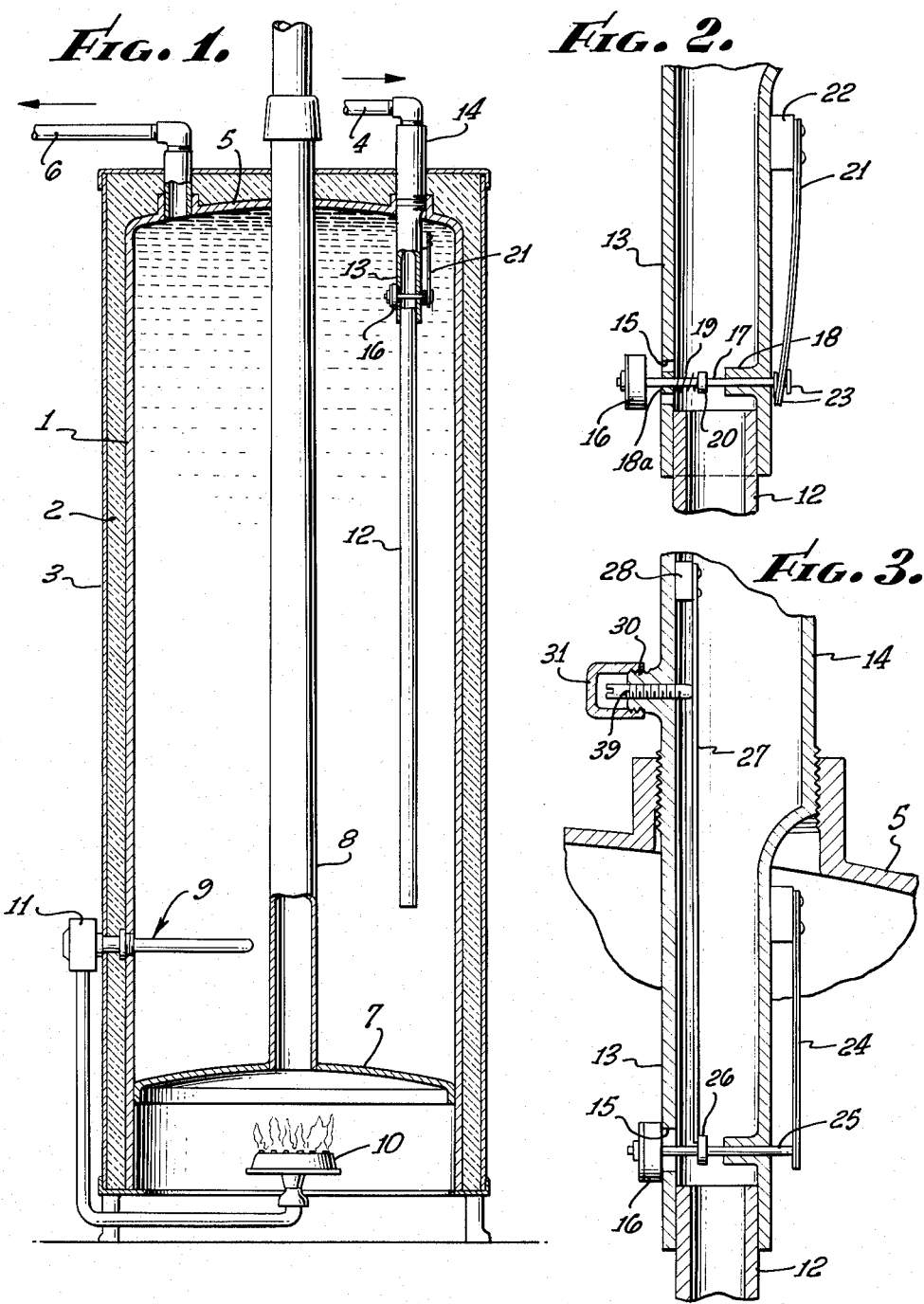

3,258,005
SYSTEM FOR CONTROLLING DEGREE OF STRATIFICATION IN HOT WATER HEATERS
Richard D. Grayson, La Canada, Calif., assignor to International Telephone and Telegraph Corporation, Baltimore, Md., a corporation of Maryland
Filed Aug. 17, 1959, Ser. No. 834,352
3 Claims. (Cl. 126—362)

This invention relates to hot water heaters. Such heaters at the present time invariably include thermostatic controls for activating the heating means (either employing fuels or electrical energy) when the temperature of the water at the thermostat reaches a lower limit; and the heating is automatically terminated when a higher temperature limit is reached.

As a matter of practice, it is common to locate the thermostatic control considerably below the top of the heater tank. The cold water inlet into the tank is also located substantially below the top so as not materially to reduce the temperature of the main body of the water. Since the heated water rises toward the top of the tank, stratification occurs, i.e., there is a temperature differential between the low and upper portions of the tank. Such stratification becomes much more pronounced when relatively small amounts of hot water are withdrawn at intermittent intervals. Although the main body of the water in the tank is fully heated, the reduction of the water temperature at the inlet serves to cause the thermostat control to activate the heating means until the lower stratum attains a desired temperature. This heating, however, raises the temperature of the water adjacent the top of the tank beyond the desired value. Continued short withdrawals of this character may cause an intolerably large increase in the temperature at the top of the tank.

For example, a water heater with a thermostat set to shut off at 140° is filled with cold water and allowed to heat until shut off automatically by the thermostat. At the end of this initial heating cycle, the temperature of the water will be uniformly 140°. Subsequently, sufficient cold water is drawn to cool the thermostatic element to 120° causing the thermostat to snap on even though the main body of water is still at 140°. The thermostat will remain on until the temperature of the thermostatic element is again 140°. By this time, however, the temperature at the top of the tank has become heated to perhaps 150° due to the direct heat transfer from the flue gases to the water at the top of the tank. Several such short cycles can cause the temperature at the top of the tank to rise as much as 40° or 50° above the shutoff temperature of the thermostat.

It is one of the objects of this invention to make it possible to maintain the temperature at the top of the tank within safe and tolerable limits even upon intermittent short withdrawals of the hot water. As a consequence, the differential between the temperature at the thermostat and that at the top of the tank is held to a reasonable value.

This object is accomplished by feeding at least a part of the cold water needed to replenish the tank directly near the top of the tank so as to dilute the hot water. This by-passing of the cold water to the top of the tank is made to respond to an abnormally high temperature, such as 180° or so, at the hottest part of the body of water.

It is accordingly another object of this invention to provide a simple yet effective way to add cold water to the top portion of the tank instead of only at a lower level whenever the temperature at the top attains an undesirable high temperature.

It is still another object of this invention to provide a simple device for adjusting the temperature at the top of the tank, at which temperature the cold water is passed into the upper part of the tank.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic sectional view of a hot water heater incorporating the invention;

FIG. 2 is an enlarged fragmentary sectional view, illustrating a by-pass valve mechanism utilized in connection with the invention; and FIG. 3 is a view similar to FIG. 2, but of a modified form of the invention.

The hot water heater includes, as usual, a tank 1 having a layer of insulation 2 and a sheet metal cover 3.

A cold water inlet 4 is indicated passing through the domed top 5 of the tank 1. A hot water outlet connection 6 is similarly indicated.

Adjacent the lower portion of the tank, the usual tank bottom 7 is provided, serving as a support for a flue 8 extending upward and through the top 5.

A thermostat structure 9 of any conventional form may be utilized to control the supply of fuel to the burner 10 located beneath the bottom 7. The controls may be incorporated in a casing or housing 11 appropriately supported on the outside of tank 1. The thermostat structure 9 is subjected to the temperature of the water at a place substantially below the top of the tank 1.

The inlet 4 is provided with a downwardly extending dip tube 12 which leads the cold inlet water to a region of the tank 1 at about the level of the thermostat 9.

Upon intermittent short draws of hot water through the outlet 6, the thermostat 9 is intermittenly subjeced to a relatively low temperature of the flow of incoming water passing out of the lower end of the tube 12. Accordingly, in spite of the fact that the water near the top 5 of the tank 1 is just as hot as before the draws, additional heat is imparted to the body of water, and the upper layer of water may attain an undesired high temperature.

In order to cure this condition, means are provided, as illustrated in FIG. 2, for by-passing at least some of the replenishing water to a region adjacent the top of the tank 1 when the temperature at the top of the tank exceeds a preset safe limit.

Thus, for example, as shown in FIG. 2, the lower end 13 of the inlet fitting 14 extends within the tank 1 and is provided with a port or opening 15 in one wall thereof. This opening 15 is intended to be closed by a valve closure 16. In the position shown in FIG. 1, this valve closure is in the closed position, and any water entering the inlet 4 for replenishing the water in the tank 1 will be discharged into the tank at a level corresponding to the lower end of the dip tube 12.

However, when the temperature reaches an intolerable value at the top of the tank, such as, for example, an increase of about 40° or 50° above the temperature at the thermostat 9, the valve closure 16 is pushed open by the aid of a stem 17. This stem is guided in a boss 18 formed on the inner surface of the extension 13. A sleeve guide 18a for the stem 17 is provided diametrically opposite the boss 18. A compression spring 19, acting against a collar 20, urges the closure 16 to the closed position.

In order to move the closure 16 to the open position, use is made of a temperature responsive element, such as a bimetal 21 mounted upon a block 22. This block 22 is attached to the exterior of the extension 13. Its free end is bifurcated so as to be disposed between the two spaced collars 23 carried by the right-hand end of the stem 17.

While the temperature of the water adjacent the top of the tank 1 is within safe limits, the bimetal 21 is ineffective to push the stem 17 toward the left. However, upon a definite rise in temperature, the stem 17 is moved by the free end of bimetal 21 so as to urge the closure 16 to the open position of FIG. 2. Under such circumstances, any water passing downwardly from the inlet 4 will be partially diverted to the port 16 to mix with the hot water at the top of the tank and thereby dilute it.

In the form shown in FIG. 3, provisions are made for adjusting the temperature at which the bimetal member 24 may be operative to move the valve closure 16 to open position. For this purpose, the stem 25 carrying the closure 16 is provided with a collar 26 urged toward the right by the lower end of a leaf spring 27. This leaf spring 27 is mounted within the fitting 14 upon a block 28. An adjusting headless screw 29 contacts the left-hand side of the leaf spring 27. In this way the force of the spring 27 urging the collar 26 toward the right is adjusted. This correspondingly adjusts the temperature at which the bimetal 24 is effective to flex toward the left for urging the closure 16 to open position.

The screw 29 is threaded into an externally threaded boss 30 which is appropriately covered as by a cap 31.

The inventor claims:

1. In a water heater system: a water tank, said tank having an inlet conduit and an outlet conduit, the inlet conduit extending inwardly from the top portion of the tank to a position substantially below the top portion; said inlet conduit having a port located at a substantial distance above the low end of the inlet conduit for by-passing water from the inlet to the upper part of the tank; a closure external of the inlet conduit for closing the port; means mounting said closure for movement toward and from the port; and means responsive to a rise in temperature of the water adjacent the top of the tank for moving said closure to open position.

2. In a water heater system: a water tank, said tank having an inlet conduit and an outlet conduit, the inlet conduit extending inwardly from the top portion of the tank to a position substantially below the top portion; said inlet conduit having a port located at a substantial distance above the low end of the inlet conduit for by-passing water from the inlet to the upper part of the tank; a closure external of the inlet conduit for closing the port; means mounting said closure for movement toward and from the port; and a bimetal member subjected to the temperature of the water at the top of the tank, coupled to the closure for moving the closure to open position upon attainment of a definite high temperature of the water.

3. In a water heater system: a water tank, said tank having an inlet conduit and an outlet conduit, the inlet conduit extending inwardly from the top portion of the tank to a position substantially below the top portion; said inlet conduit having a port located at a substantial distance above the low end of the inlet conduit for by-passing water from the inlet to the upper part of the tank; a closure external of the inlet conduit for closing the port; means mounting said closure for movement toward and from the port; a bimetal member subjected to the temperature of the water at the top of the tank, coupled to the closure for moving the closure to open position upon attainment of a definite high temperature of the water; and means resiliently resisting opening movement of the closure.

References Cited by the Examiner
UNITED STATES PATENTS

| | | | |
|---|---|---|---|
| 1,681,377 | 8/1928 | Stack | 126—362 X |
| 2,076,087 | 4/1937 | Long | 126—362 |
| 2,115,601 | 4/1938 | Whitby et al. | |
| 2,495,857 | 1/1950 | Massare | 236—101 |
| 2,715,420 | 8/1955 | Stearns | 236—101 |
| 2,814,279 | 11/1957 | Thomas | 126—362 X |

FOREIGN PATENTS

| | | |
|---|---|---|
| 14,290 | of 1907 | Great Britain. |
| 282,075 | 8/1928 | Great Britain. |

FREDERICK L. MATTESON, JR., *Primary Examiner.*

PERCY L. PATRICK, *Examiner.*

R. A. DUA, *Assistant Examiner.*